United States Patent
Yang

(10) Patent No.: US 11,332,309 B2
(45) Date of Patent: May 17, 2022

(54) OVERHEAD TYPE TRANSPORT APPARATUS

(71) Applicant: LG ELECTRONICS INC., Seoul (KR)

(72) Inventor: Hyunseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 16/489,991

(22) PCT Filed: Apr. 9, 2019

(86) PCT No.: PCT/KR2019/004172
§ 371 (c)(1),
(2) Date: Aug. 29, 2019

(87) PCT Pub. No.: WO2020/209398
PCT Pub. Date: Oct. 15, 2020

(65) Prior Publication Data
US 2020/0385026 A1 Dec. 10, 2020

(51) Int. Cl.
| *B61B 3/02* | (2006.01) |
| *B65G 1/04* | (2006.01) |
| *B65G 21/22* | (2006.01) |
| *B65G 47/61* | (2006.01) |
| *B61D 45/00* | (2006.01) |

(Continued)

(52) U.S. Cl.
CPC .............. *B65G 1/0457* (2013.01); *B61B 3/02* (2013.01); *B61D 45/00* (2013.01); *B65G 21/22* (2013.01); *B65G 47/61* (2013.01); *B60L 53/30* (2019.02); *B60L 2200/26* (2013.01); *B60L 2200/40* (2013.01); *B61D 49/00* (2013.01); *Y02T 10/70* (2013.01); *Y02T 10/7072* (2013.01); *Y02T 90/12* (2013.01)

(58) Field of Classification Search
CPC ........ B65G 1/0457; B65G 1/00; B65G 21/22; B65G 47/61; B61B 3/02; B60L 53/30; B60L 2200/40; B61D 45/00; B61D 49/00; Y02T 10/70; Y02T 10/7072; Y02T 90/12
See application file for complete search history.

(56) References Cited

U.S. PATENT DOCUMENTS

| 2009/0101039 A1 | 4/2009 | Zaguroli, Jr. |
| 2014/0217975 A1 | 8/2014 | Hayashi |

(Continued)

FOREIGN PATENT DOCUMENTS

| KR | 1996-0031311 A | 9/1996 |
| KR | 10-2004-0049574 A | 6/2004 |
| KR | 10-2013-0059989 A | 6/2013 |

(Continued)

*Primary Examiner* — Zachary L Kuhfuss
(74) *Attorney, Agent, or Firm* — Birch, Stewart, Kolasch & Birch, LLP

(57) ABSTRACT

An overhead type transport apparatus includes: a guide rail that includes a main rail and one or more sub rails crossing the main rail and is fixed to a ceiling side; two or more transport units that travel along the guide rail; a carrier unit that is coupled to the bottom of each transport unit and rotates about a carrier rotating unit, one end being inclined upward or downward with respect to the other end; and a basket unit that is attached to and detached from the bottom of each carrier unit.

20 Claims, 11 Drawing Sheets

(51) Int. Cl.
 *B60L 53/30* (2019.01)
 *B61D 49/00* (2006.01)

(56) References Cited

U.S. PATENT DOCUMENTS

2016/0280460 A1* 9/2016 Porat .......................... B25J 5/04
2020/0243363 A1* 7/2020 Yuasa .................. B65G 1/0457

FOREIGN PATENT DOCUMENTS

KR    10-2015-0012159 A      2/2015
KR       20200082011 A   *  7/2020

\* cited by examiner

[FIG. 1]
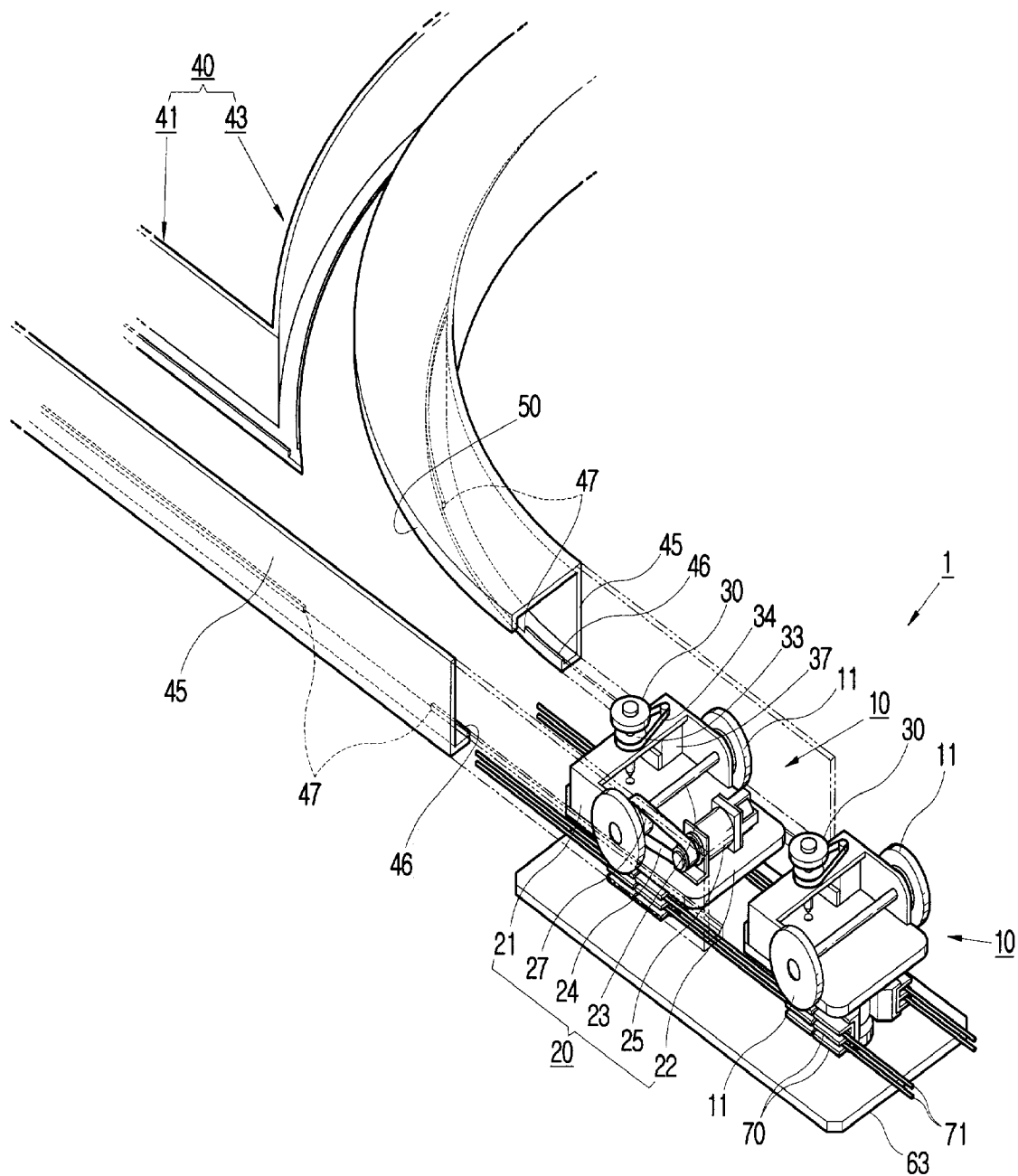
Conventional Art

[FIG. 2]
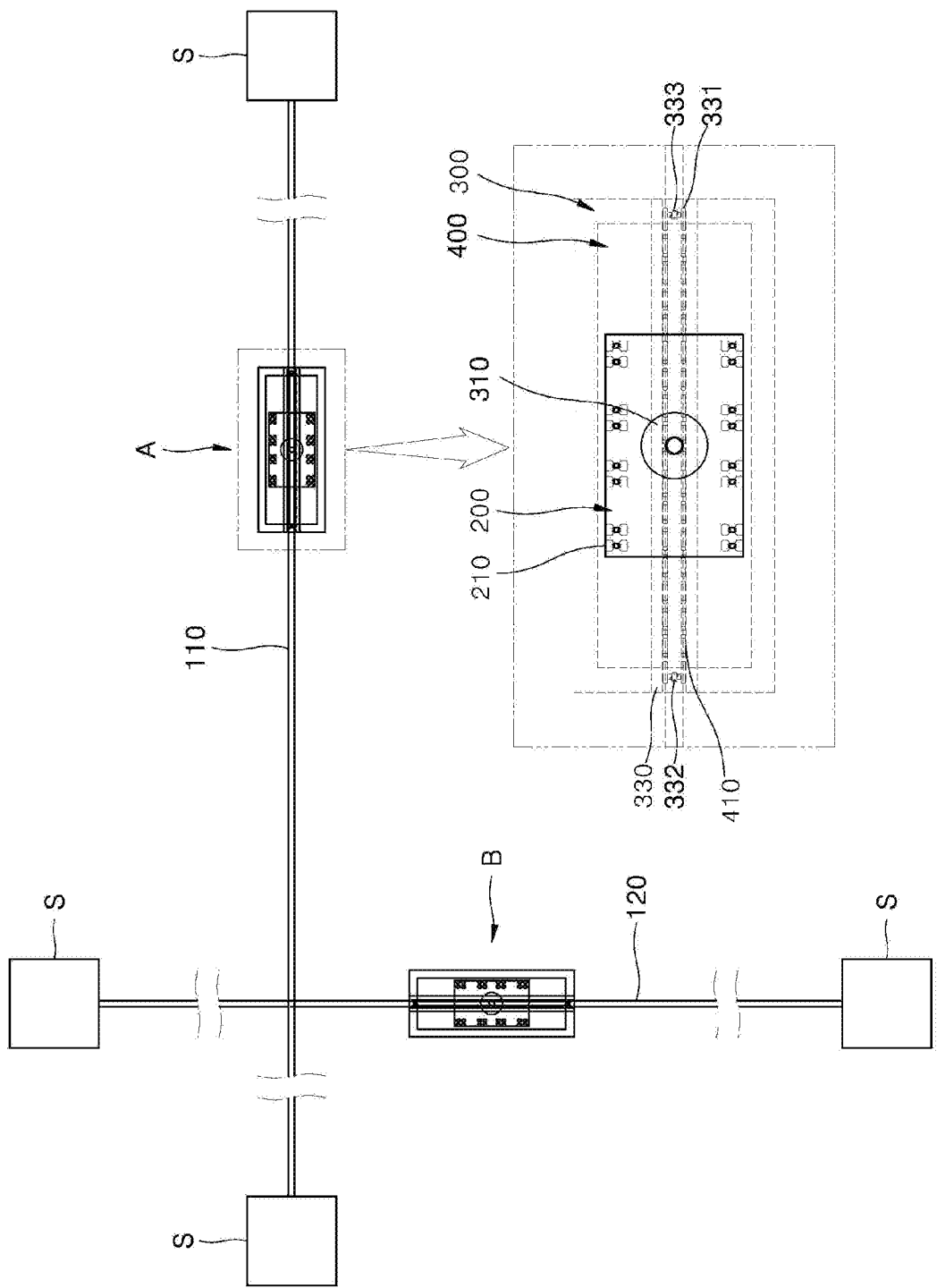

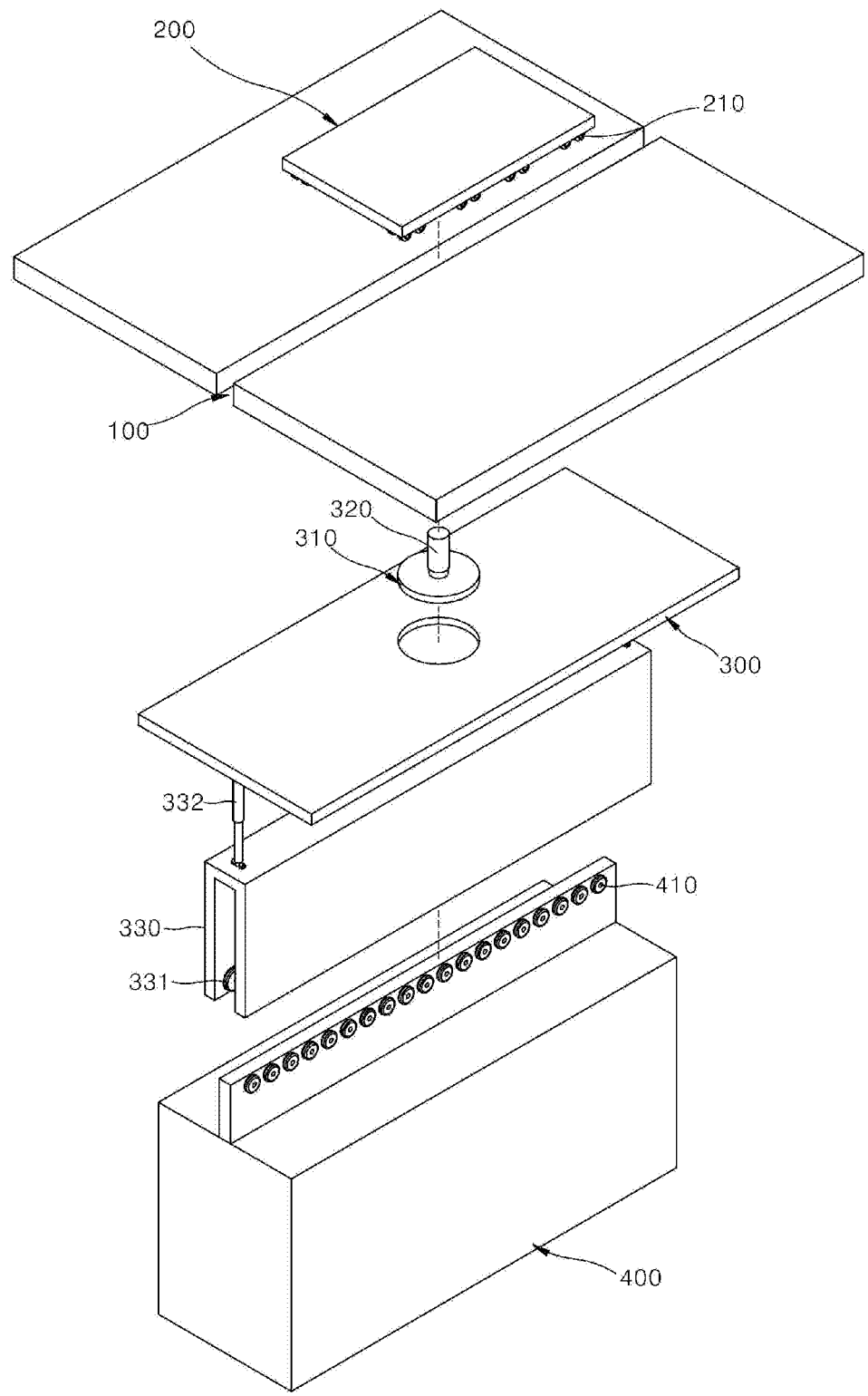
[FIG. 3]

[FIG. 4]
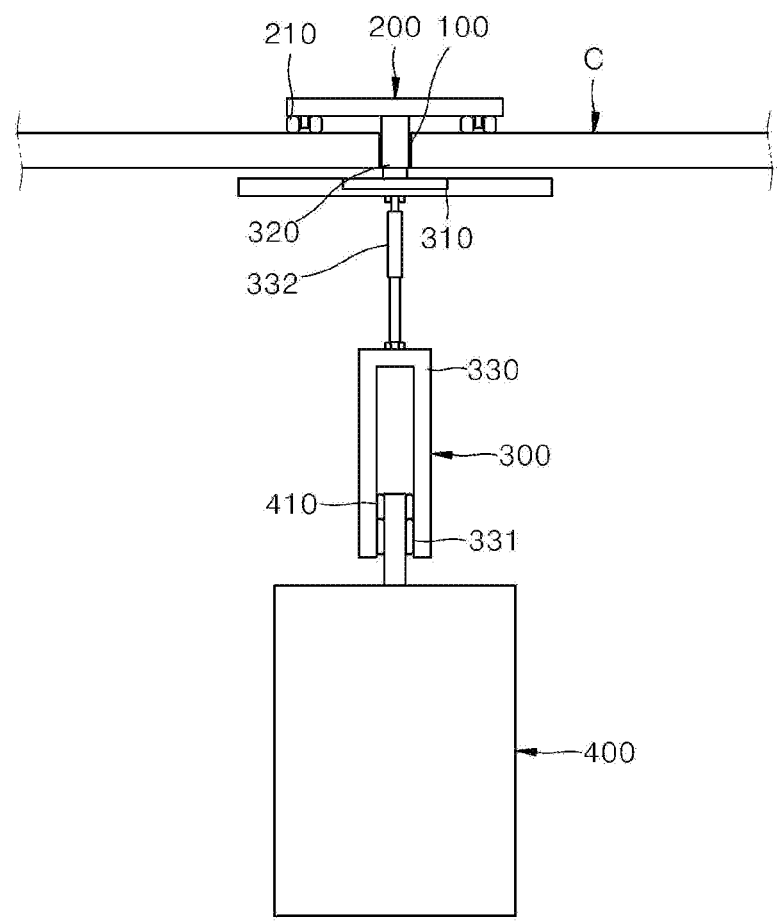

[FIG. 5]
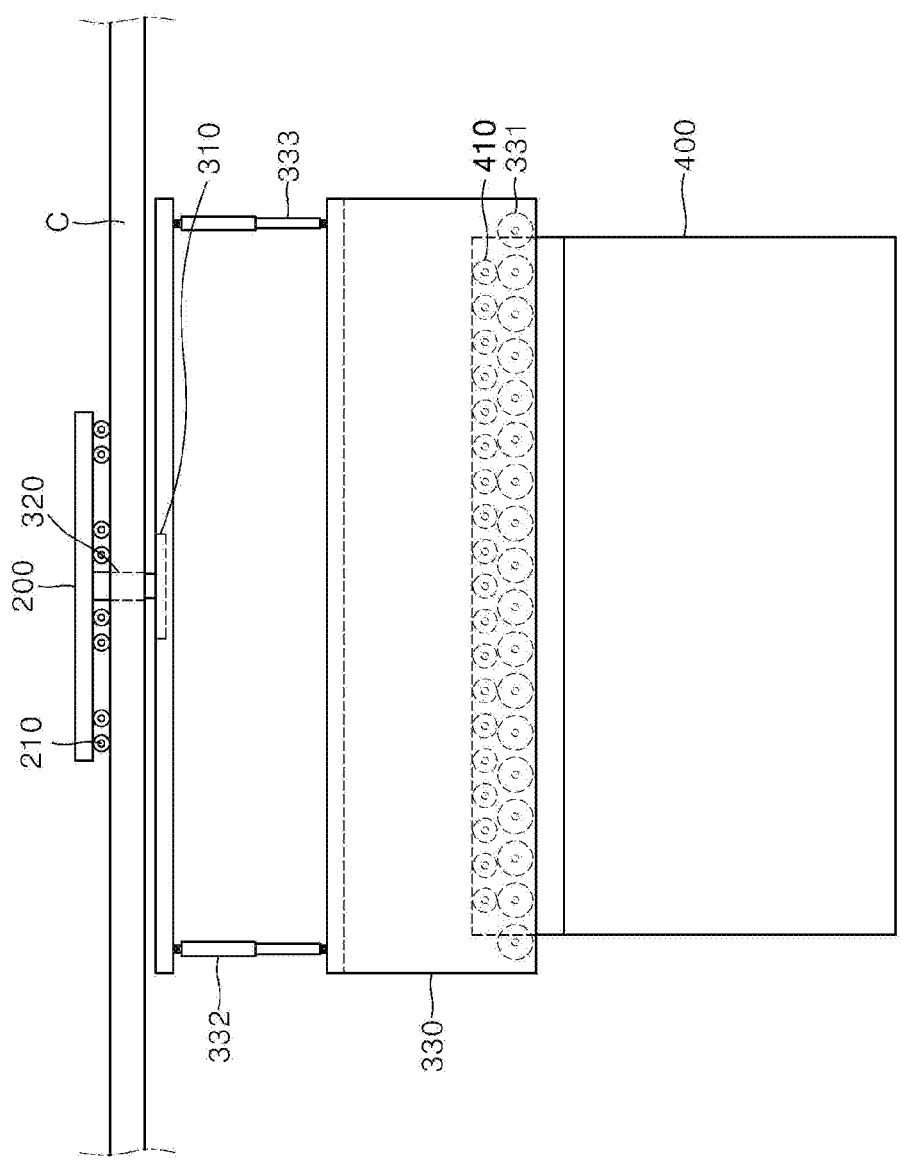

[FIG. 6]
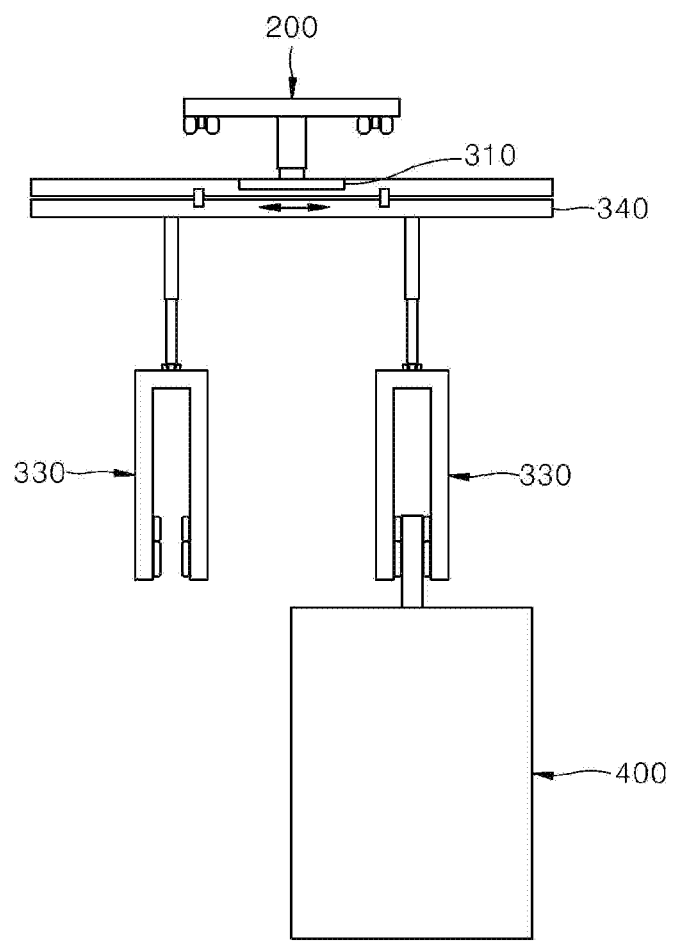

[FIG. 7]
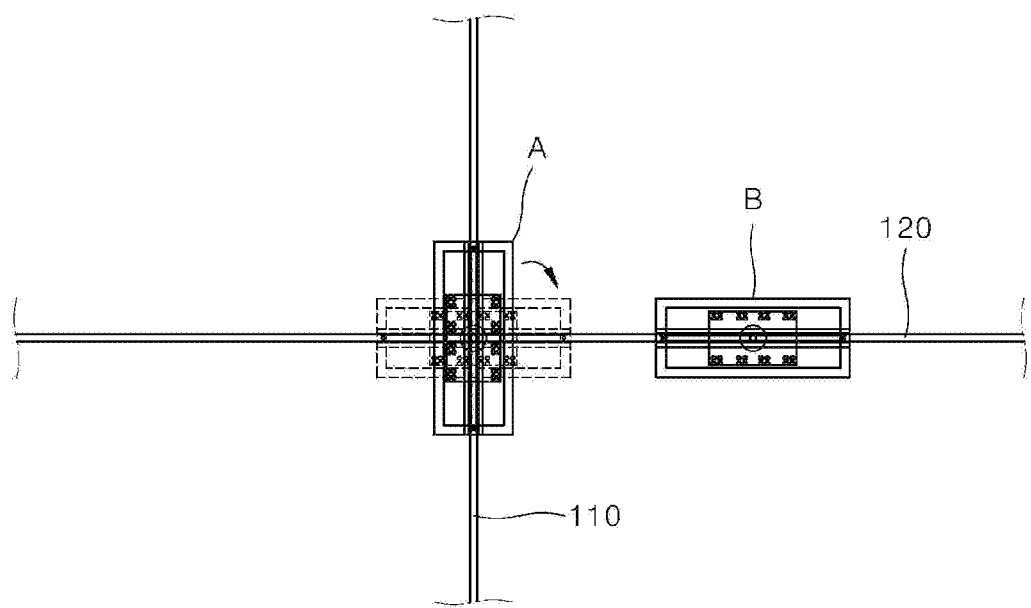

[FIG. 8]
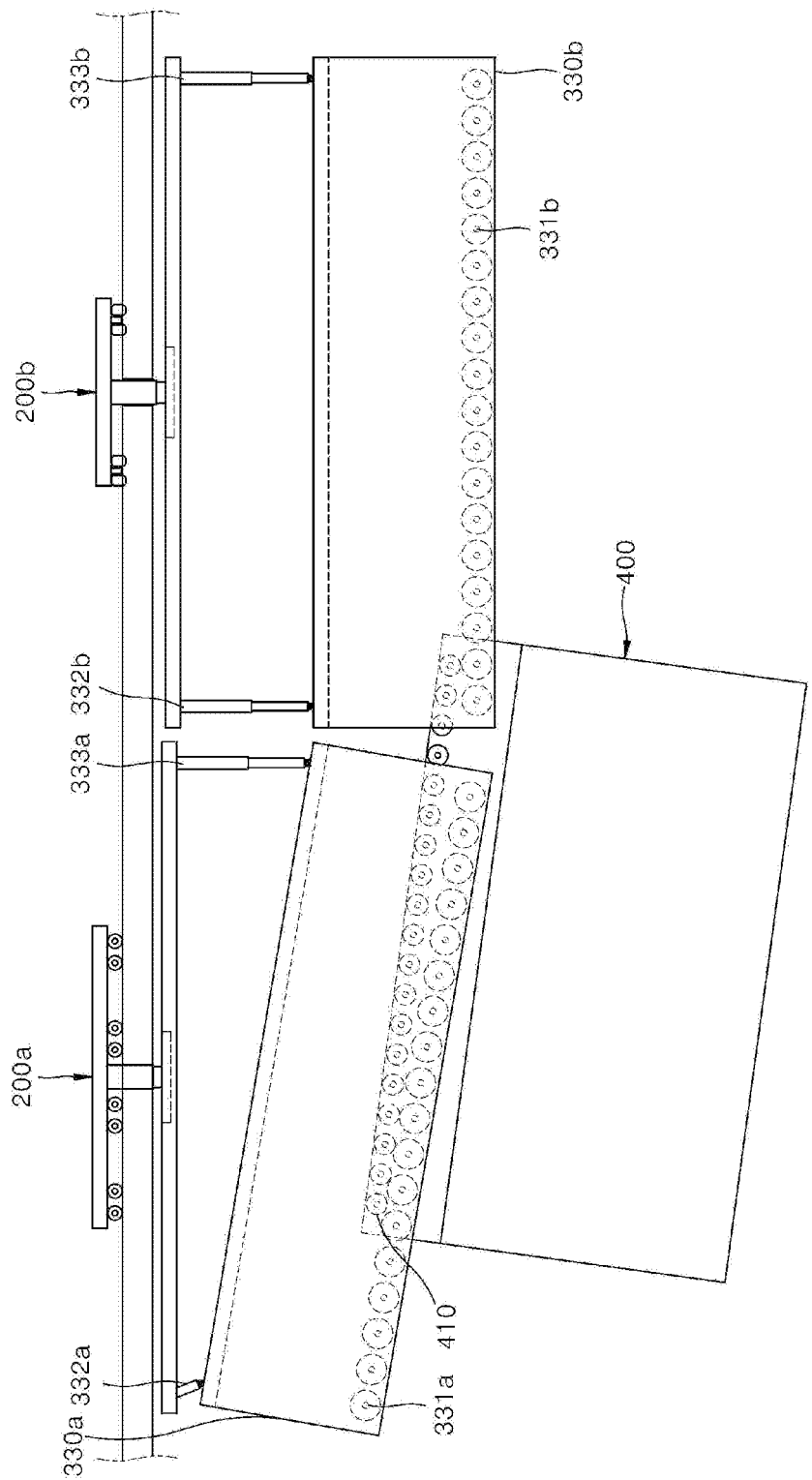

[FIG. 9]
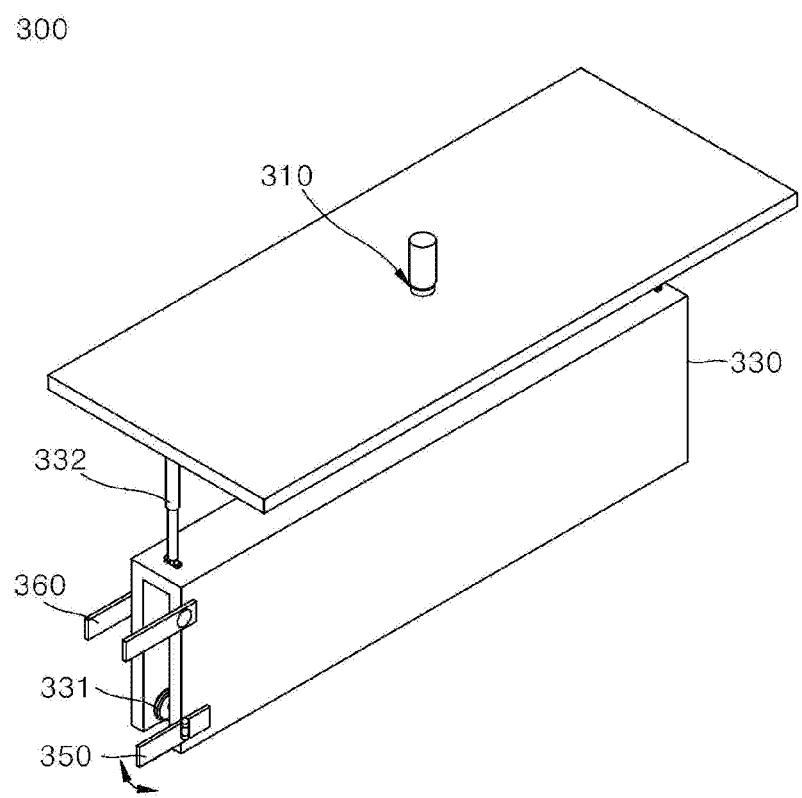

[FIG. 10]
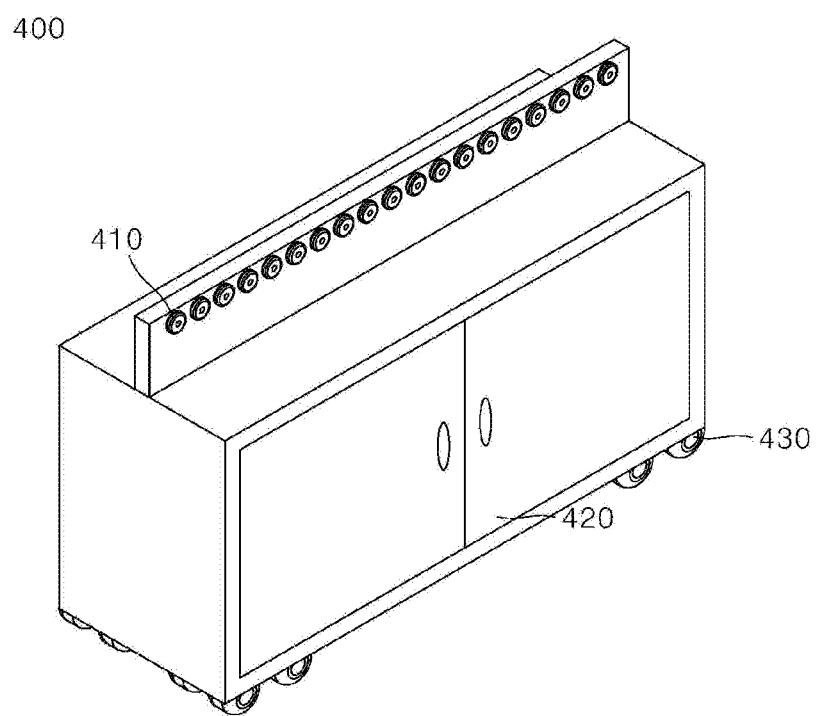

[FIG. 11]
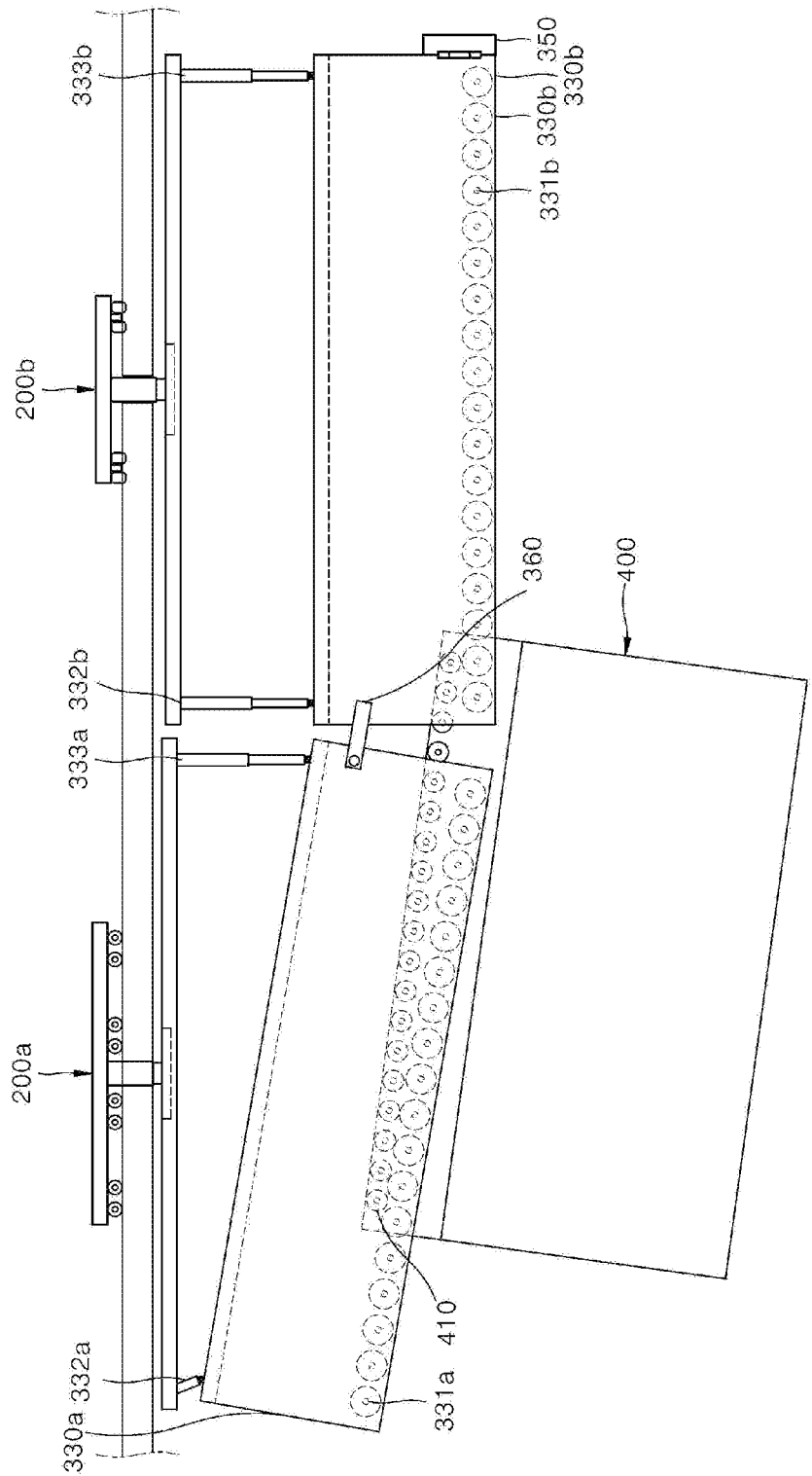

OVERHEAD TYPE TRANSPORT APPARATUS

CROSS REFERENCE TO RELATED APPLICATIONS

This application is the National Phase of PCT/KR2019/004172 filed on Apr. 9, 2019, which is hereby expressly incorporated by reference into the present application.

TECHNICAL FIELD

The invention relates to an overhead type transport apparatus.

BACKGROUND ART

In general, a transport apparatus is an apparatus that is installed in a warehouse, a warehouse type shopping center, or a manufacturing plant and transports a transport object to a destination.

This transport apparatus performs a transport operation by loading or clamping a transport object and traveling on the ground.

However, persons walk or a plurality of obstacles such as a shelf are disposed on the ground.

Accordingly, a ground traveling type transport apparatus can cause a mortality accident or a delay due to another transport apparatus or an obstacle.

A ground traveling type transport apparatus includes both a traveling algorithm and an obstacle avoidance algorithm and thus causes a problem with an increase in manufacturing cost.

A drone or the like that clamps a transport object and moves in an overhead area may be utilized as such a transport apparatus.

However, a drone generates relatively much noise and has restrictions in transporting a transport object with a large weight.

An overhead type transport apparatus has been utilized to solve this problem.

In general, an overhead type transport apparatus includes a guide rail that is installed on the ceiling of a structure and a transport member that is provided to clamp a transport object and to travel on the guide rail.

In this regard, the following patent literature is known.

1. Korean Patent Application Laid-open No. 10-2004-0049574 (Publication Date: 2004 Jun. 12)

Title of Invention: OVERHEAD TYPE TRANSPORT APPARATUS

However, the conventional overhead type transport apparatus has the following problem.

As illustrated in FIG. 1, the conventional overhead type transport apparatus includes a transport member 10 that selectively travels on a main track 41 and a sub track 43 depending on a transport destination.

Accordingly, the conventional overhead type transport apparatus includes a roller 30 that ascends and descends on the transport member 10 in order to transfer the transport member from the main track 41 to the sub track 43.

The guide rail 40 includes a guide protrusion 46 in which a cutout portion 47 is formed in a junction area in which the main track 41 and the sub track 43 meet.

Accordingly, the conventional overhead type transport apparatus has a problem in which the structure of the guide rail 40 and the transport member 10 are relatively complicated.

In the conventional overhead type transport apparatus, another transport member 10 cannot be added to the guide rail 40 while one transport member 10 is moving from a starting point to a destination point along the guide rail 40.

Accordingly, the conventional overhead type transport apparatus is restricted in a transport rate and has difficulty in application to a case in which there are a plurality of objects to be transported.

DISCLOSURE

Technical Problem

The invention has been made to solve the above-mentioned problems and an objective thereof is to provide an overhead type transport apparatus including a guide rail and a transport unit with a relatively simple structure in which a structure for allowing the transport unit to transfer a rail in a rail junction area is omitted.

Another objective of the invention is to provide an overhead type transport apparatus that can improve transport efficiency by employing a plurality of transport units that travel along a plurality of guide rails of which two or more cross each other.

Another objective of the invention is to provide an overhead type transport apparatus that can improve efficiency by allowing the overhead type transport apparatuses to deliver or exchange a transport object to minimize a delay of a transport unit.

Another objective of the invention is to provide an overhead type transport apparatus that can prevent damage or falling of a transport object by stably delivering the transport object between the overhead type transport apparatuses.

Technical Solution

In order to achieve the above-mentioned objectives, an overhead type transport apparatus according to an embodiment of the invention includes two or more transport units that travel along a guide rail which includes a main rail and a sub rail and which is fixed to the ceiling side and each transport unit includes one or more carrier units.

Specifically, since a transport unit can move along a straight or curved rail without transferring the rail in an area in which a main rail and a sub rail cross each other, it is possible to simplify the structures of the guide rail and the transport unit.

Transport efficiency can be improved by employing a plurality of transport units.

The overhead type transport apparatus includes: a guide rail that includes a main rail and one or more sub rails crossing the main rail and is fixed to a ceiling side; two or more transport units that travel along the guide rail; a carrier unit that is coupled to the bottom of each transport unit and rotates about a carrier rotating unit, one end being inclined upward or downward with respect to the other end; and a basket unit that is attached to and detached from the bottom of each carrier unit.

Both ends of each of the main rail and the sub rail may include a charging station.

The transport unit may include at least one pair of transport unit wheels which are driven by a drive motor.

The transport unit may be provided above the guide rail.

The carrier unit may include a main cylinder such that the carrier unit ascends and descends.

In order to achieve the above-mentioned objectives, an overhead type transport apparatus according to an embodiment of the invention includes a carrier unit and a basket unit that delivery a transport object between two overhead type transport apparatuses.

More specifically, the carrier unit may include a carrier housing with a "⊓" shape in which a plurality of carrier rollers which are coupled in a horizontal direction are provided in an inner lower end portion to face each other.

The carrier housing may include a sub cylinder at both upper ends such that one end is inclined downward or upward with respect to the other end.

Two or more carrier housings may be provided to be symmetric with respect to the carrier rotating unit.

The basket unit may include a plurality of basket rollers on an upper side thereof and is coupled to each carrier unit such that the basket rollers are securely attached onto the carrier rollers.

In order to achieve the above-mentioned objectives, a basket unit of an overhead type transport apparatus according to an embodiment of the invention may store information of a starting point and an arrival point of a transport object which is loaded therein.

The carrier unit may include a carrier unit sensor on at least one of a front side and a rear side thereof.

The carrier unit may include a weight sensor that detects whether the basket unit is coupled thereto.

The carrier unit may include a carrier housing moving unit that is provided in the bottom of the carrier rotating unit and moves the carrier housing to right or left.

The carrier unit may include a basket unit stopper that is provided on at least one of a front side and a rear side thereof and prevents the basket unit from falling from the front side or the rear side.

The basket unit stopper may have a plate shape and may open and close a front surface or a rear surface of the carrier housing in a folding or sliding manner.

The carrier housing may include a pair of carrier housing guides that are formed to protrude from at least one lateral end thereof.

Each carrier housing guide may be formed in a plate shape.

The basket unit may include an object sensor on at least one of a front side and a rear side thereof.

The basket unit may include a door for loading and unloading a transport object.

The basket unit may include at least one pair of basket wheels on the bottom thereof.

Advantageous Effects

According to the invention, since the transport unit of the overhead type transport apparatus can travel without transferring a rail depending on a destination of a transport object, it is possible to further simplify structures of the rails and the transport unit in comparison with the conventional overhead type transport apparatus.

With the overhead type transport apparatus, it is possible to improve transport efficiency by mounting a plurality of basket units in one transport unit.

Since a transport object is delivered or exchanged between the overhead type transport apparatuses, it is possible to minimize a moving route for each transport unit and to improve transport efficiency.

With the overhead type transport apparatus, it is possible to prevent damage or falling of a transport object at the time of delivery of the transport object between the overhead type transport apparatuses.

DESCRIPTION OF DRAWINGS

FIG. 1 is a perspective view illustrating a conventional overhead type transport apparatus.

FIG. 2 is a top view illustrating an example in which an overhead type transport apparatus is mounted in each of a main rail and a sub rail crossing each other according to an embodiment of the invention.

FIG. 3 is an exploded perspective view of an overhead type transport apparatus according to an embodiment of the invention.

FIG. 4 is a front view of an overhead type transport apparatus according to an embodiment of the invention.

FIG. 5 is a side view of an overhead type transport apparatus according to an embodiment of the invention.

FIG. 6 is a front view of an overhead type transport apparatus in which two carrier housings are coupled to one transport unit according to an embodiment of the invention.

FIG. 7 is a top view illustrating an example in which a basket unit is delivered between overhead type transport apparatuses according to an embodiment of the invention.

FIG. 8 is a side view illustrating an example in which a basket unit is delivered between overhead type transport apparatuses according to an embodiment of the invention.

FIG. 9 is a perspective view of a carrier unit according to another embodiment of the invention.

FIG. 10 is a perspective view of a basket unit according to another embodiment of the invention.

FIG. 11 is a side view illustrating an example in which a basket unit is delivered between overhead type transport apparatuses according to another embodiment of the invention.

MODES OF THE INVENTION

Hereinafter, some embodiments of the invention will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

FIG. 2 is a top view illustrating an example in which an overhead type transport apparatus is mounted in each of a main rail and a sub rail crossing each other according to an embodiment of the invention.

FIGS. 3 to 5 are an exploded perspective view, a front view, and a side view of an overhead type transport apparatus according to an embodiment of the invention.

Referring to FIGS. 2 to 5, an overhead type transport apparatus according to an embodiment of the invention includes a guide rail 100 that includes a main rail 110 and one or more sub rails 120 crossing the main rail 110 and is fixed to the ceiling side, two or more transport units 200 that travel along the guide rail 100, a carrier unit 300 that is coupled to the bottom of each transport unit 200 and rotates about a carrier rotating unit 310 and in which one end is inclined upward or downward with respect to the other end, and a basket unit 400 that is attached to and detached from the bottom of each carrier unit 300.

A charging station S that charges the transport unit 200 and the carrier unit 300 is provided at both ends of each of the main rail 110 and the sub rail 120.

Accordingly, the overhead type transport apparatus is continuously charged while it does not transport a transport object.

The guide rail 100 may include a plurality of main rails 110 and a plurality of sub rails 120 that cross the plurality of main rails 110.

The main rails 110 and the sub rails 120 are formed in a straight or curved hole shape on the ceiling connecting a starting point and an arrival point of each transport object.

The transport unit 200 includes at least one pair of transport unit wheels 210 that are driven by a drive motor (not illustrated), and can travel above the guide rail 100.

The transport unit 200 has a width greater than the width of the carrier unit 300 such that the carrier unit 300 and the basket unit 400 coupled to the bottom thereof are supported and the transport unit 200 is not inclined.

The transport unit 200 may be provided in each of the main rail 110 and the sub rail 120.

Accordingly, a structure for allowing the transport unit 200 to transfer a rail at a point at which the main rail 110 and the sub rail 120 cross each other can be omitted.

Accordingly, the guide rail 110 and the transport unit 200 can be formed with a relative simple structure in comparison with a transport apparatus that transfers a rail.

As described above, the carrier unit 300 is formed such that one end is inclined upward or downward with respect to the other end.

Accordingly, when the carrier units 300 of the overhead type transport apparatuses according to an embodiment of the invention are adjacent to each other, the basket unit 400 can be delivered from the carrier unit 300 inclined to one side to the other carrier unit 300 due to a height difference. A detailed structure thereof will be described later.

The carrier unit 300 may ascend or descend using a main cylinder 320.

Accordingly, the carrier unit 300 approaches and is coupled to the basket unit 400 having a transport object mounted therein on the ground.

The carrier unit 300 includes a carrier housing 330 with an "⊓" shape in which a plurality of carrier rollers 331 coupled to each other in the lateral direction are formed in an inner lower end portion to face each other.

The carrier housing 330 includes sub cylinders 332 and 333 at both ends of an upper side such that one end is inclined downward or upward with respect to the other end.

A process of coupling the basket unit having a transport object to the overhead type transport apparatus is as follows.

The basket unit 400 is coupled to the carrier unit 300 such that a plurality of basket rollers 410 formed on the upper side are securely attached onto the carrier rollers 331.

Accordingly, when the basket unit 400 having a transport object loaded therein is placed on the ground, the carrier unit 300 descends to the basket unit 400 by the main cylinder 320.

Thereafter, the basket unit 400 is coupled to the carrier unit 300 such that the basket rollers 410 are securely attached onto the carrier rollers 331, and ascends to the overhead by the main cylinder 320.

FIG. 6 is a front view of an overhead type transport apparatus in which two carrier housings are coupled to one transport unit according to an embodiment of the invention.

Referring to FIG. 6, two or more carrier housings 330 are formed to be symmetric with respect to the carrier rotating unit 310.

Accordingly, since a plurality of basket units 400 can be transported while the transport unit 200 reciprocates once along the guide rail 100, it is possible to increase an amount of transport per unit time.

When a plurality of carrier housings 330 are provided as described above, the transport unit 200 has a width greater than the width of the carrier unit 300 such that the weights of the carrier unit 300 and the basket unit 400 are supported and the transport unit is not inclined.

FIG. 7 is a top view illustrating an example in which a transport object is delivered between overhead type transport apparatuses according to an embodiment of the invention.

More specifically, FIG. 7 is a top view illustrating an example in which a first overhead type transport apparatus A traveling on the main rail 110 and a second overhead type transport apparatus B traveling on the sub rail 120 are close to each other.

Here, the first overhead type transport apparatus A and the second overhead type transport apparatus B have the same configuration except for the basket unit 400.

FIG. 8 is a side view illustrating an example in which a basket unit is delivered between overhead type transport apparatuses according to an embodiment of the invention.

More specifically, FIG. 8 is a side view illustrating an example in which a carrier housing 330a of the first overhead type transport apparatus A and a carrier housing 330b of the second overhead type transport apparatus B are arranged on the same line and a basket unit 400 is delivered therebetween.

The process of delivering the basket unit 400 between the first overhead type transport apparatus A and the second overhead type transport apparatus B will be described below with reference to FIGS. 7 and 8.

As illustrated in FIG. 7, the first overhead type transport apparatus A moves along the main rail 110 in a state in which a basket unit 400 having a transport object loaded therein is coupled thereto.

When the first overhead type transport apparatus A is close to the sub rail 120 at an arrival point of the transport object, the second overhead type transport apparatus B moves to the first overhead type transport apparatus A along the sub rail 120.

Thereafter, as illustrated in FIG. 8, the first overhead type transport apparatus A is rotated by the carrier rotating unit 310 such that the carrier unit 300a is located on the same line as the carrier unit 300b of the second overhead type transport apparatus B.

At this time, an angle which is formed by the transport unit 200a of the first overhead type transport apparatus A and the transport unit 200b of the second overhead type transport apparatus B is the same as an angle which is formed by the main rail 110 and the sub rail 120 which are formed to cross each other.

Thereafter, the carrier housing 330*a* of the first overhead type transport apparatus A is inclined to the carrier housing 330*b* of the second overhead type transport apparatus by the sub cylinders 332*a* and 333*a*.

More specifically, in the carrier housing 330*a* of the first overhead type transport apparatus A, the length of the sub cylinder 333*a* close to the carrier housing 330*b* of the second overhead type transport apparatus B is not changed and the length of the sub cylinder 332*a* which is formed on the other side is decreased.

Accordingly, the basket unit 400 coupled to the first overhead type transport apparatus A moves to the carrier housing 330*b* of the second overhead type transport apparatus B along the inclined carrier housing 330*a*.

At this time, it is preferable that the carrier rollers 331 and the inner top surface of the carrier housing 330 be sufficiently separated from each other such that the basket unit 400 does not interfere with the inner top surface of the carrier housing 330 while being inclined.

That is, the basket unit 400 coupled to the first overhead type transport apparatus A is coupled to the carrier housing 330*b* of the second overhead type transport apparatus B due to a height difference between the carrier rollers 331*a* of the first overhead type transport apparatus A and the carrier rollers 331 *b* of the second overhead type transport apparatus.

Thereafter, the first overhead type transport apparatus A returns to the starting point, and the second overhead type transport apparatus B moves to the arrival point of the transport object and securely places the basket unit 400 on the ground.

At this time, the basket unit 400 stores information of the starting point and the arrival point of the transport object loaded therein.

The carrier unit 300 may include a carrier unit sensor (not illustrated) on at least one of the front side and the rear side.

Accordingly, it can be detected whether the carrier housing 330*a* of the first overhead type transport apparatus A and the carrier housing 330*b* of the second overhead type transport apparatus B are located on the same line.

The carrier unit 300 may include a weight sensor (not illustrated) that detects whether the basket unit 400 has been coupled thereto.

Accordingly, with the overhead type transport apparatus, it is possible to prevent an accident at the time of delivery of the basket unit 400 between the carrier units 300 to which the basket unit 400 is coupled.

As described above, delivery of the basket unit 400 is performed by arrangement and inclination of the carrier housings 330.

Accordingly, the same is true when an overhead type transport apparatus in which two carrier housing 330 are provided in one transport unit 200 delivers the basket unit 400 to another overhead type transport apparatus as illustrated in FIG. 6.

At this time, arrangement of the carrier housings 330 can be performed by movement of the transport unit 200.

As illustrated in FIG. 6, the carrier unit 300 may further include a carrier housing moving unit 340 that moves the carrier housing 330 to right and left on the lower side of the carrier rotating unit 310.

The carrier housing moving unit 340 can move to right and left by a sliding hinge.

Accordingly, the carrier housing moving unit 340 may perform arrangement of the carrier housings 330 instead of movement of the transport unit 300.

In the overhead type transport apparatus, since the carrier housings 330 coupled to one transport unit 200 can be independently inclined or kept horizontal, it is possible to perform exchange of a transport object between the overhead type transport apparatuses as well as delivery thereof.

FIG. 9 is a perspective view of a carrier unit according to another embodiment of the invention.

Referring to FIG. 9, the carrier unit 300 may include a basket unit stopper 350 that prevents the basket unit 400 from falling from the front side or the rear side on at least one of the front side and the rear side thereof.

The basket unit stopper 350 is formed to be opened and closed in a folding manner.

The basket unit stopper 350 may be formed to block the front surface or the rear surface of the carrier housing 330 in a sliding manner.

Accordingly, with the overhead type transport apparatus, it is possible to prevent the basket unit 400 coupled to the carrier unit 300 from falling due to vibration or inclination during movement.

Even when the basket unit 400 is delivered between the overhead type transport apparatuses as described above, the basket unit stopper 350 can prevent the basket unit 400 from falling.

The carrier housing 330 may include a pair of carrier housing guides 360 on at least one of both lateral ends thereof.

The carrier housing guides 360 are means for assisting arrangement of the carrier housings 330 when the basket unit 400 is delivered between the overhead type transport apparatuses and detailed description thereof will be described later.

FIG. 10 is a perspective view of a basket unit according to another embodiment of the invention.

Referring to FIG. 10, the basket unit 400 includes an object sensor 420 on at least one of the front side and the rear side thereof.

Accordingly, it is possible to prevent a collision accident which occurs when the basket unit 400 is coupled to the carrier unit 300 and moves in the overhead.

Particularly, it is possible to prevent an accident which occurs when the carrier unit 300 moves along the guide rail 100 in a state in which it is not sufficiently ascended by the main cylinder 320.

The object sensor 420 can detect an overhead obstacle such as a drone and determine a moving speed of the transport unit 200 or whether the transport unit 200 is to be stopped.

The basket unit 400 may include a door 420 for loading and unloading a transport object or may include a separate clamping means.

The basket unit 400 includes at least one pair of basket wheels 430 on the lower side and improves convenience of movement when the basket unit 400 is placed on the ground.

FIG. 11 is a side view illustrating an example in which a basket unit is delivered between overhead type transport apparatuses according to another embodiment of the invention.

Referring to FIGS. 8 and 11, the carrier housing guides 360 are means for maintaining two carrier housings 330*a* and 330*b* which are arranged in the same line.

More specifically, the carrier housing guides 360 may be a pair of plates or protrudes which protrudes forward or rearward from the carrier housing 330.

Accordingly, the carrier housing guides 360 can fix the outer side of the front surface or the rear surface of the neighboring carrier housing 330 to prevent a lateral shift of the arranged carrier housings 330a and 330b.

Particularly, when an overhead type transport apparatus including the carrier housing guides 360 approaches another overhead type transport apparatus and delivers the basket unit 400 thereto, it is possible to prevent a lateral shift and to stably perform the delivery of the basket unit.

When the carrier housing guides 360 are not used, the carrier housing guides 360 may be inserted into the carrier housing 330 or may be folded outward such that they do not protrude from the front side or the rear side of the carrier housing 330.

The invention claimed is:

1. An overhead type transport apparatus comprising:
a guide rail that includes a main rail and one or more sub rails crossing the main rail and is fixed to a ceiling side;
two or more transport units that travel along the guide rail;
a carrier unit that is coupled to the bottom of each transport unit and rotates about a carrier rotating unit, one end being inclined upward or downward with respect to the other end; and
a basket unit, that is attached to and detached from the bottom of each carrier unit,
wherein the carrier unit includes a carrier housing in which a plurality of carrier rollers, which are coupled in a horizontal direction, are provided in an inner lower end portion to face each other.

2. The overhead type transport apparatus according to claim 1, wherein both ends of each of the main rail and the sub rail include a charging station.

3. The overhead type transport apparatus according to claim 1, wherein the transport unit includes at least one pair of transport unit wheels which are driven by a drive motor.

4. The overhead type transport apparatus according to claim 3, wherein the transport unit is provided above the guide rail.

5. The overhead type transport apparatus according to claim 1, wherein the carrier unit includes a main cylinder such that the carrier unit ascends and descends.

6. The overhead type transport apparatus according to claim 1, wherein the carrier housing has an n-shape.

7. The overhead type transport apparatus according to claim 1, wherein the carrier housing includes a sub cylinder at both upper ends such that one end is inclined downward or upward with respect to the other end.

8. The overhead type transport apparatus according to claim 7, wherein two or more carrier housings are provided to be symmetric with respect to the carrier rotating unit.

9. The overhead type transport apparatus according to claim 8, wherein the carrier unit includes a carrier housing moving unit that is provided in the bottom of the carrier rotating unit and moves the carrier housing to right or left.

10. The overhead type transport apparatus according to claim 7, wherein the basket unit includes a plurality of basket rollers on an upper side thereof and is coupled to each carrier unit such that the basket rollers are securely attached onto the carrier rollers.

11. The overhead type transport apparatus according to claim 10, wherein the basket unit stores information of a starting point and an arrival point of a transport object which is loaded therein.

12. The overhead type transport apparatus according to claim 10, wherein the basket unit includes an object sensor on at least one of a front side and a rear side thereof.

13. The overhead type transport apparatus according to claim 10, wherein the basket unit includes a door for loading and unloading a transport object.

14. The overhead type transport apparatus according to claim 10, wherein the basket unit includes at least one pair of basket wheels on the bottom thereof.

15. The overhead type transport apparatus according to claim 7, wherein the carrier unit includes a carrier unit sensor on at least one of a front side and a rear side thereof.

16. The overhead type transport apparatus according to claim 7, wherein the carrier unit includes a weight sensor that detects whether the basket unit is coupled thereto.

17. The overhead type transport apparatus according to claim 7, wherein the carrier unit includes a basket unit stopper that is provided on at least one of a front side and a rear side thereof and prevents the basket unit from falling from the front side or the rear side.

18. The overhead type transport apparatus according to claim 17, wherein the basket unit stopper has a plate shape and opens and closes a front surface or a rear surface of the carrier housing in a folding or sliding manner.

19. The overhead type transport apparatus according to claim 7, wherein the carrier housing includes a pair of carrier housing guides that are formed to protrude from at least one lateral end thereof.

20. The overhead type transport apparatus according to claim 19, wherein each carrier housing guide is formed in a plate shape.

* * * * *